Nov. 17, 1925.
I. BRACZIK
PIPE UNION
Filed Sept. 26, 1924
1,562,142
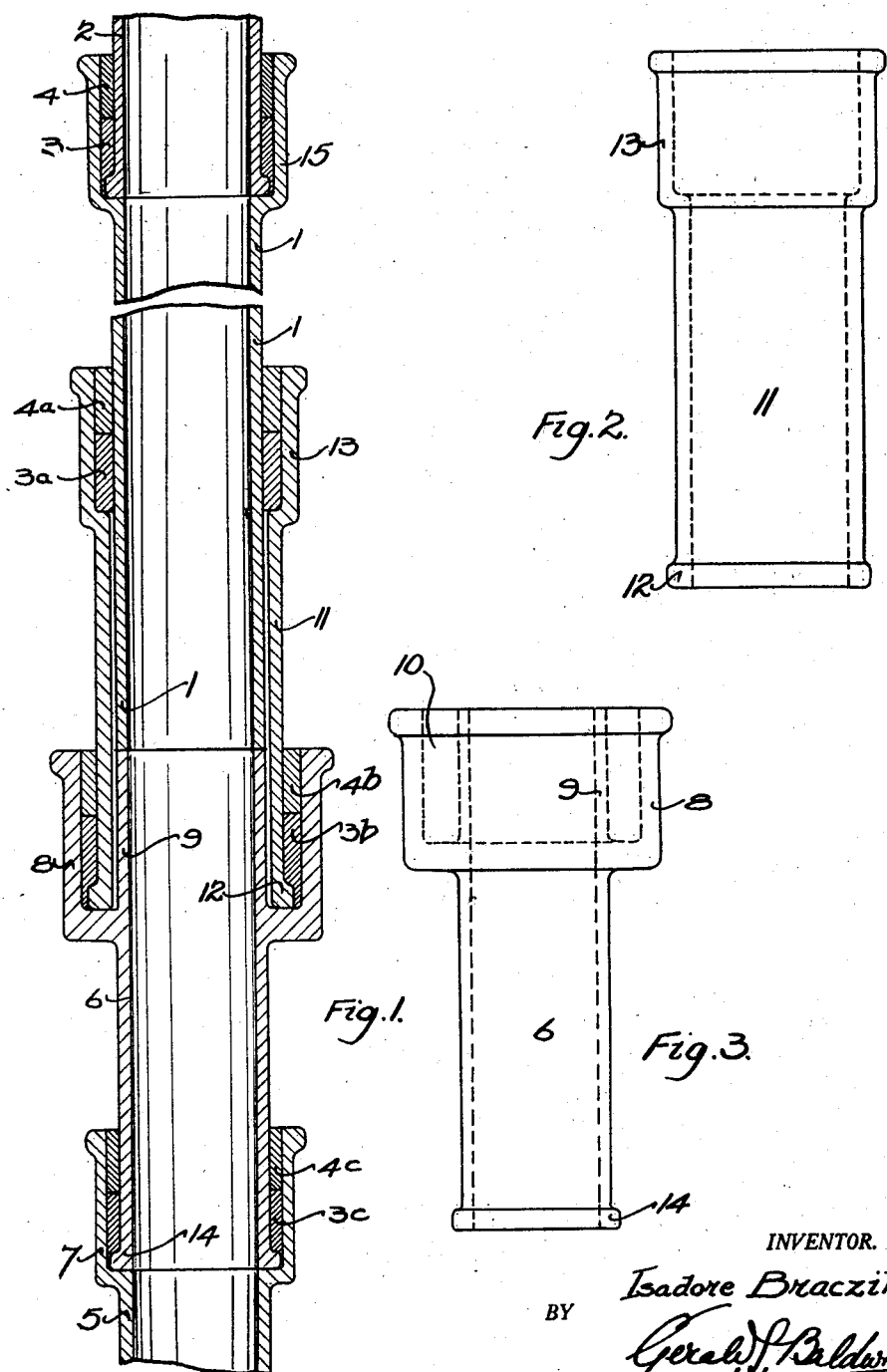
INVENTOR.
Isadore Braczik.
BY Gerald P. Baldwin
ATTORNEY.

Patented Nov. 17, 1925.

1,562,142

UNITED STATES PATENT OFFICE.

ISADORE BRACZIK, OF DETROIT, MICHIGAN.

PIPE UNION.

Application filed September 26, 1924. Serial No. 740,055.

*To all whom it may concern:*

Be it known that I, ISADORE BRACZIK, a citizen of Poland, residing at Detroit, in the county of Wayne and State of Michigan, have invented a new and useful Improvement in Pipe Unions, of which the following is a specification.

This invention relates to improvements in pipe unions, and refers more particularly to unions for that class of pipe wherein joints are made by inserting one end of a pipe into a hub provided on the end of the pipe which is to be connected to it, such as cast iron soil pipe.

Hitherto it has not been possible to remake a really satisfactory joint in this class of pipe after one of the lengths has been disturbed subsequent to its installation.

One of the objects of this invention is to supply a pipe union by means of which a tight satisfactory joint can be made at any time, and which does not always necessitate disturbing the top joint of the length of pipe which has been cut and on which the union is to be used for its installation.

A further object of the invention is to provide a union which is simple and cheap to manufacture, and which can be made tight by joints similar to those commonly used to join one length of pipe to another.

The method by which these and other objects are attained is hereinafter more fully described with the aid of the accompanying drawings wherein:

Figure 1 illustrates a sectional view of pipe in which a union is shown.

Figure 2 is a side elevation of a sliding member, and

Figure 3 is a side view of a spacing member.

Referring more particularly to the drawings, 1 designates a length of pipe connected to the upper length 2 in the ordinary way by a packed lead joint, the packing being indicated at 3 and the lead at 4. 5 indicates a lower pipe length.

The spacing member 6 has a lower male end 14, similar to those at the lower end of each of the ordinary pipe lengths, and is adapted to fit into the hub 7 of the pipe 5. The upper end of the spacing member has a hub 8 in which is an inner concentric sleeve 9 integral with the spacing member and of substantially the same bore and thickness as the pipe 1 which is adapted to rest on and be joined to it. An annular groove 10 is formed between the inner side of the hub 8 and the outer circumference of the sleeve 9.

The sliding member 11 is of such diameter that it can be moved freely up and down the pipe length 1, and the lower male end 12 is adapted to rest in the annular groove 10. A hub 13 is also provided at the upper end of the sliding member.

In order to install a length of pipe and a union between the underside of the pipe 2 and the top of the pipe 5, the pipe 1 must be cut so that its length and the distance between the top of the concentric sleeve 9 and the underside of the spacing member 6 together equal the length of the original pipe by which the pipes 2 and 5 were originally connected.

The spacing member 6 is set in position with its male end 14 within the hub 7 of the pipe 5; the sliding member is arranged round the pipe 1, and, if the joint at the top of the latter has been broken which in practice I generally find unnecessary, the hub 15 of the said pipe 1 is then placed round the pipe 2 and raised so that it is in proper relation to the pipe 2. It will then be found that the lower end of the pipe 1 will just slide over the upper surface of the sleeve 9 on which it is adapted to rest. When the pipe 1 is in alignment with the sleeve 9 the sliding member is dropped into the annular groove 10.

The joint between the pipe 2 and the hub 15 of the pipe 1, if it has been broken, the joint between the hub 13 of the sliding member 11 and the outer circumference of the pipe 1, the joint between the hub 8 of the spacing member 6 and the lower end of the sliding member 11, and the joint between the hub 7 of the pipe 5 and the lower end 14 of the spacing member 6 are then all made as by the packed lead joints wherein the packing is indicated at 3, 3ª, 3ᵇ, and 3ᶜ respectively, and the lead is indicated at 4, 4ª, 4ᵇ, and 4ᶜ respectively.

From the foregoing it is thought that a clear conception of my invention can be obtained. It is however understood that I may make alterations and modifications to the embodiment of my invention herein described and shown, provided the said alterations and modifications fall within the scope of what I claim.

What I claim as my invention and desire to secure by Letters Patent is:—

1. A pipe union of the class described comprising a tubular spacing member having a hub at one end, an annular groove and a concentric sleeve within said hub, and a male pipe connection adapted to fit into an ordinary pipe hub at the other end, in combination with a sliding member having one end adapted to seat in the hub of said spacing member and terminating at the other end in a hub.

2. A pipe union of the class described comprising a tubular spacing member of substantially the same diameter as the pipe to be jointed, said member terminating at one end in a hub having a concentric inner sleeve therein, in combination with a sliding member of greater diameter than the pipe to be jointed and adapted to slide thereover, one end of said sliding member being adapted to seat within the hub of said spacing member, and means for making a joint between the exterior of one of the pipes to be jointed and the interior of the other end of the sliding member.

3. A pipe union of the class described comprising a spacing member of substantially the same diameter as the pipe to be jointed and a sliding member of greater diameter than the pipe to be jointed, said spacing member having one end adapted to fit into a hub on one of the pipes to be jointed, and the other end of said spacing member having a concentric sleeve within said hub, said concentric sleeve being adapted to make a butt joint with the end of the other pipe to be jointed, said sliding member surrounding said other pipe and having one end adapted to seat within the hub of said spacing member, and a joint adapted to be made between the interior of the end of the sliding member remote from the spacing member and the exterior of the other pipe to be jointed.

4. A pipe union of the class described comprising a hollow spacing member, one end of which is adapted to be connected by a hub connection to one of the pipes to be jointed and having a hub at its other end with a concentric sleeve therein against which the end of the other pipe to be jointed is adapted to bear, in combination with a sliding member adapted to surround said other pipe and having one end adapted to fit within the hub of the spacing member, and a joint adapted to be made between the outside diameter of said other pipe and the inner diameter of the end of the sliding member remote from the spacing member.

5. A pipe union as described in claim 4, wherein a hub is provided at the end of the sliding member remote from the spacing member.

6. A pipe union of the class described comprising a spacing member having a hub at one end, a sliding member one end of which is adapted to fit within said hub, a concentric sleeve within said spacing member adapted to support the pipe to be connected, and said sliding member adapted to surround said pipe and terminating at its upper end in a hub, in combination with an ordinary male pipe connection on the other end of said spacing member adapted to fit into an ordinary pipe hub.

7. A pipe union as described in claim 6 wherein the pipe to be connected is held within the sliding member hub by an ordinary lead joint, the end of the sliding member is held within the spacing member hub by a lead joint, and the male end of the spacing member is held within an ordinary pipe hub also by a lead joint.

ISADORE BRACZIK.